US007916899B2

(12) United States Patent
Nobori et al.

(10) Patent No.: US 7,916,899 B2
(45) Date of Patent: *Mar. 29, 2011

(54) MONITORING SYSTEM AND VEHICLE SURROUNDING MONITORING SYSTEM

(75) Inventors: Kunio Nobori, Osaka (JP); Masaki Sato, Kanagawa (JP); Kazufumi Mizusawa, Kanagawa (JP); Hirofumi Ishii, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/704,738

(22) Filed: Feb. 12, 2010

(65) Prior Publication Data

US 2010/0141764 A1   Jun. 10, 2010

Related U.S. Application Data

(63) Continuation of application No. 12/267,829, filed on Nov. 10, 2008, now Pat. No. 7,693,303, which is a continuation of application No. 11/326,922, filed on Jan. 6, 2006, now Pat. No. 7,512,251, which is a continuation of application No. PCT/JP2005/009771, filed on May 27, 2005.

(30) Foreign Application Priority Data

Jun. 15, 2004 (JP) .................. 2004-176812
Jan. 12, 2005 (JP) .................. 2005-005151

(51) Int. Cl.
*G06K 9/00* (2006.01)
*H04N 5/225* (2006.01)
(52) U.S. Cl. .................. 382/104; 382/291; 348/169

(58) Field of Classification Search .................. 382/100, 382/103–107, 155, 170, 172, 178, 181, 209, 382/224, 232, 243, 255, 274, 305, 276, 321, 382/291; 340/903; 280/735; 348/159, 148, 348/169; 352/53, 173
See application file for complete search history.

(56) References Cited

U.S. PATENT DOCUMENTS

| 6,393,144 | B2 * | 5/2002 | Rogina et al. ............. 382/154 |
| 6,396,535 | B1 * | 5/2002 | Waters .................. 348/159 |
| 6,498,620 | B2 * | 12/2002 | Schofield et al. .......... 348/148 |
| 6,906,639 | B2 * | 6/2005 | Lemelson et al. .......... 340/903 |
| 6,993,159 | B1 * | 1/2006 | Ishii et al. ............. 382/104 |
| 7,243,945 | B2 * | 7/2007 | Breed et al. ............. 280/735 |

FOREIGN PATENT DOCUMENTS

| EP | 0 840 255 A2 | 5/1998 |
| JP | 06-247246 | 9/1994 |
| JP | 06-333200 | 12/1994 |
| JP | 07-186833 | 7/1995 |
| JP | 08-091122 A | 4/1996 |
| JP | 10-175482 | 6/1998 |

(Continued)

*Primary Examiner* — Seyed Azarian
(74) *Attorney, Agent, or Firm* — Harness, Dickey & Pierce, P.L.C.

(57) ABSTRACT

A parameter selection section selects one from a plurality of image synthesis parameters stored in a parameter storage section according to an output of a vehicle state detection section. An image synthesis section reads out camera images from frame memories according to the selected image synthesis parameter and generates a synthesized image showing a state of vehicle surroundings. A moving object detection section detects, in the thus generated synthetic image, a moving object region estimated as a region where a moving object is present.

2 Claims, 15 Drawing Sheets

FOREIGN PATENT DOCUMENTS

| | | |
|---|---|---|
| JP | 11-078692 | 3/1999 |
| JP | 3011566 | 12/1999 |
| JP | 2001-251608 A | 9/2001 |
| JP | 2001-283358 A | 10/2001 |
| JP | 2002-027448 A  * | 1/2002 |
| JP | 2003-191810 A | 7/2003 |
| JP | 2004-56497 A | 2/2004 |
| JP | 2004-056763 A | 2/2004 |

* cited by examiner

FIG. 2
(a) Example of shooting state
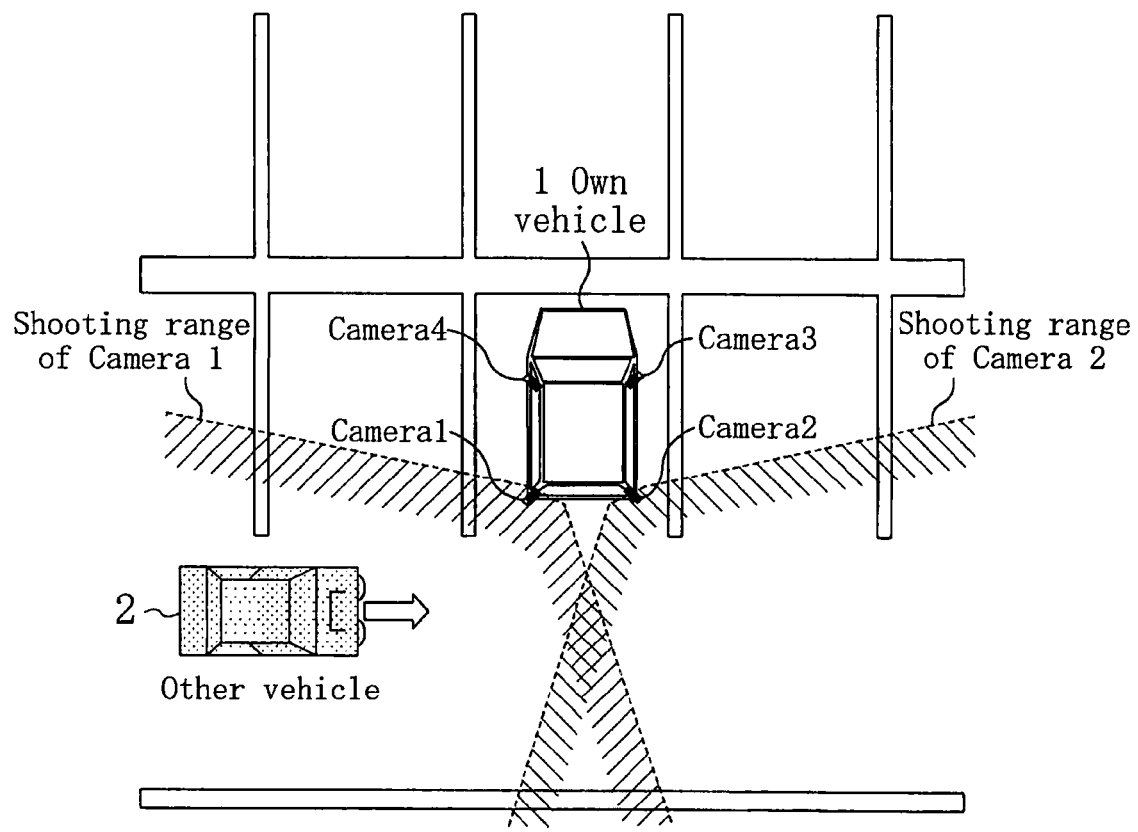
(b) Input image (Camera 1)
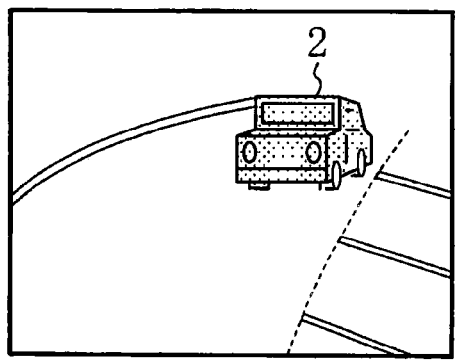
(c) Input image (Camera 2)
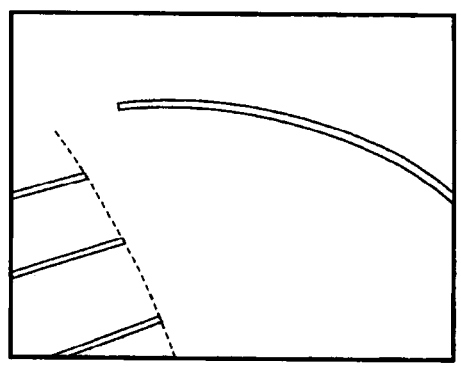

FIG. 4
(a) Composition A
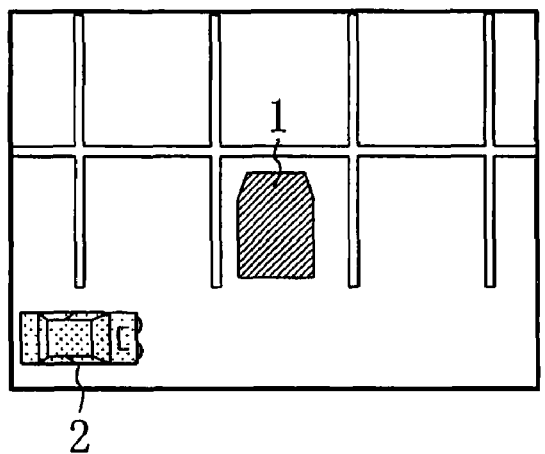
(b) Composition B
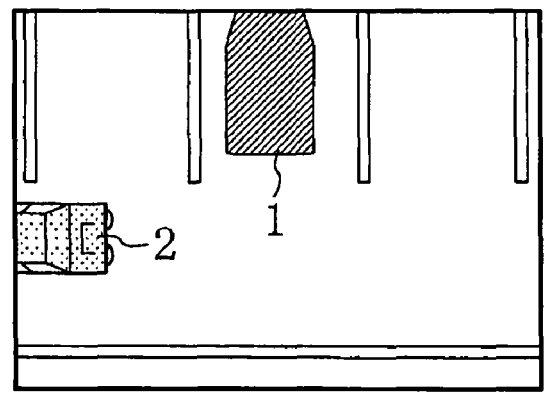
(c) Composition C
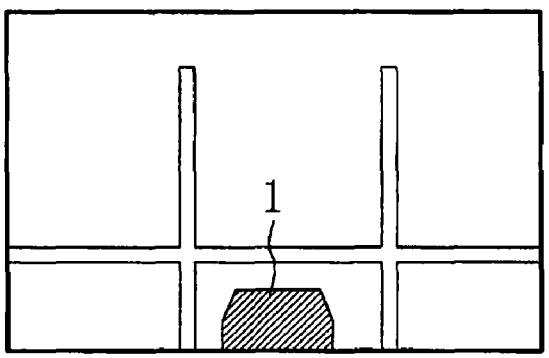
(d) Composition D
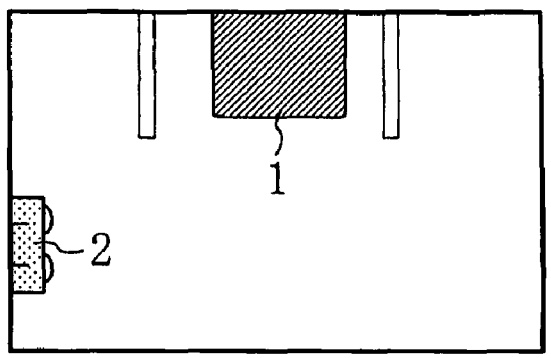

FIG. 5
| Input | | Output | |
|---|---|---|---|
| Vehicle velocity | Shift lever | Image synthesis parameter | Detection parameter |
| Stop | P or N | A | Operation |
| | R | B | Operation |
| | D, 1~3 | C | Operation |
| Move | — | A | Stop |
FIG. 6
(a) Example of region division
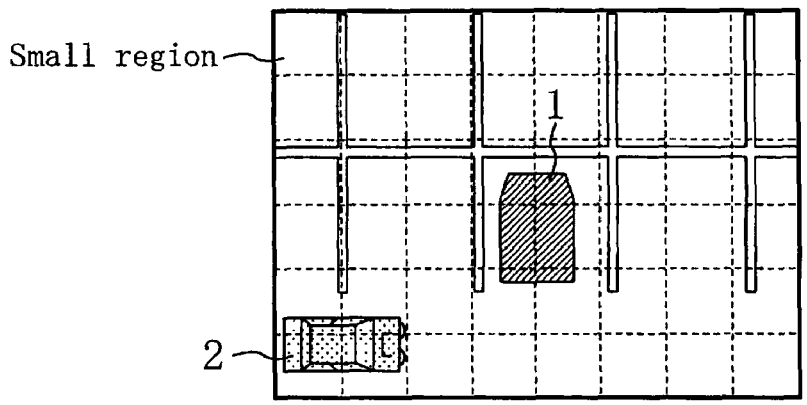
(b) Example of synthetic image for display
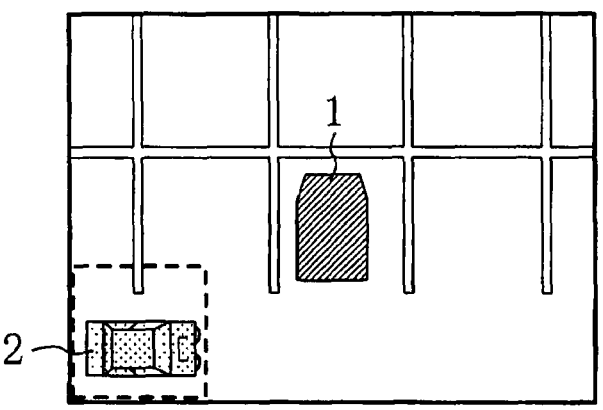

FIG. 7
(a)
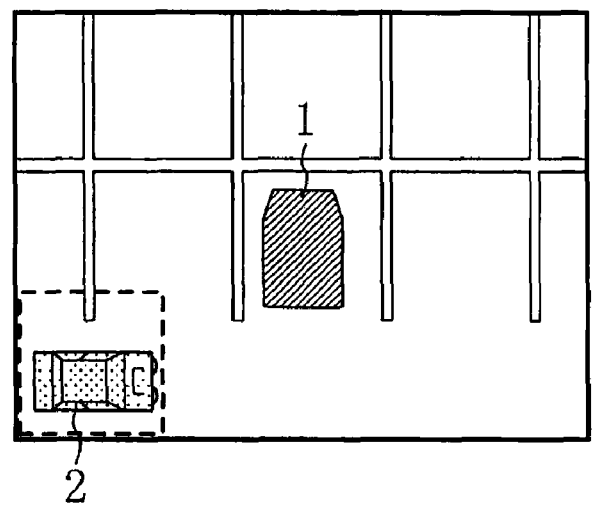
(b)
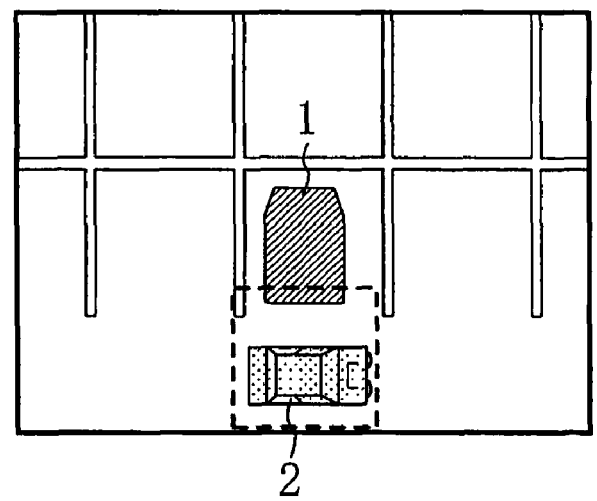
(c)
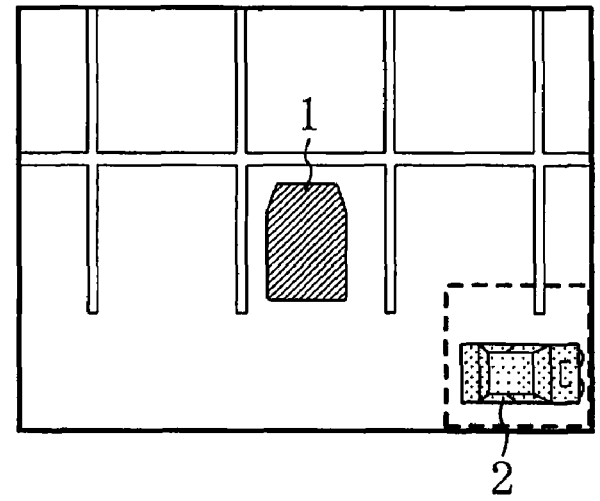

FIG. 9
(a)

| Input | | | | Output | |
|---|---|---|---|---|---|
| Current image synthesis parameter | Vehicle velocity | Shift lever | State of moving object detection in each evaluation region | Image synthesis parameter | Detection parameter |
| Initial state | | | | A | Stop |
| A | Stop | P, N | Not detected in region 1 or 3 | A | Operation |
| | | | Detected in region 1 | B | |
| | | | Detected in region 3 | C | |
| | | R | Not detected in region 1 | B | |
| | | | Detected in region 1 | D | |
| | | D, 1~3 | Not detected in region 3 | C | |
| | | | Detected in region 3 | E | |
| B | Stop | P, N | Detected in region 4 | A | |
| | | | Detected in region 4 | B | |
| | | R | Not detected in region 1 | B | |
| | | | Detected in region 1 | D | |
| ⋮ | | | ⋮ | ⋮ | |
| — | Move | — | — | A | Stop |

(b)

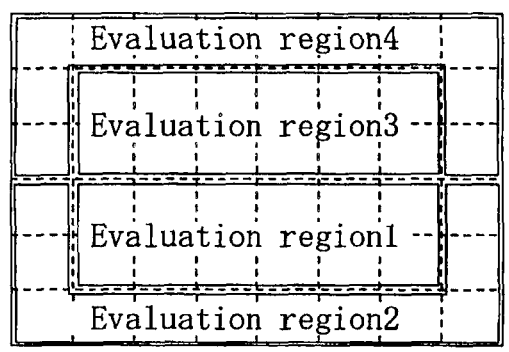

FIG. 10
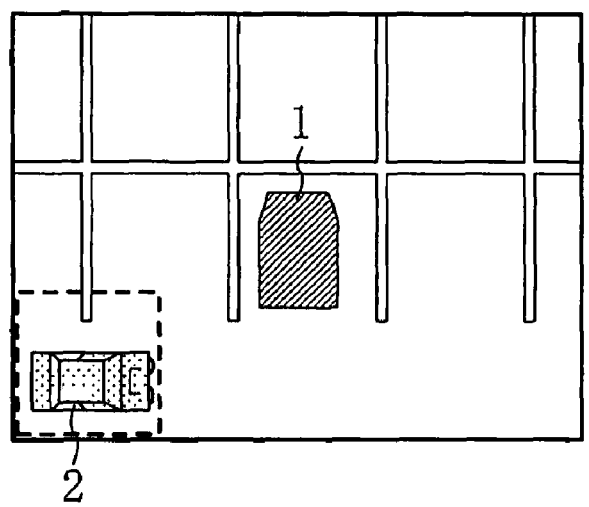
(a)
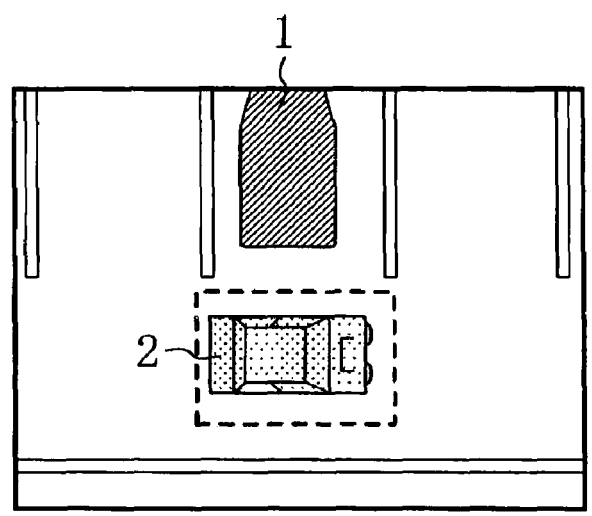
(b)
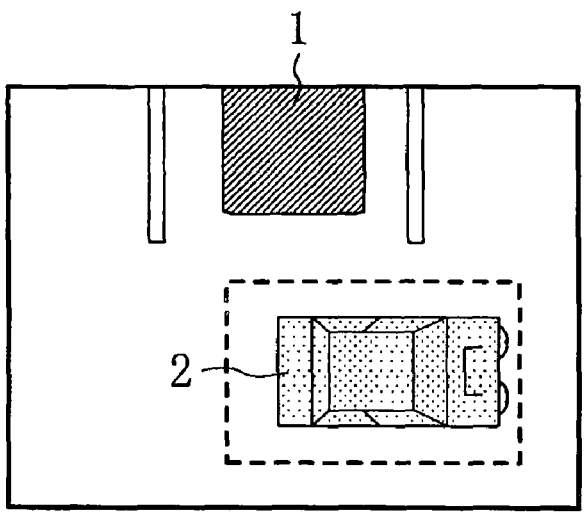
(c)

FIG. 11
(a) Composition of synthetic image
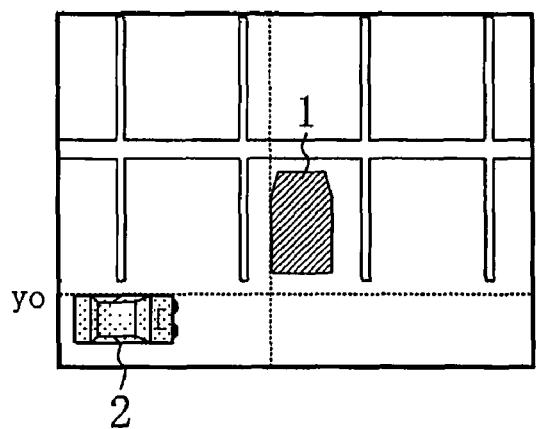
(b) Example of weight of synthetic image parameter
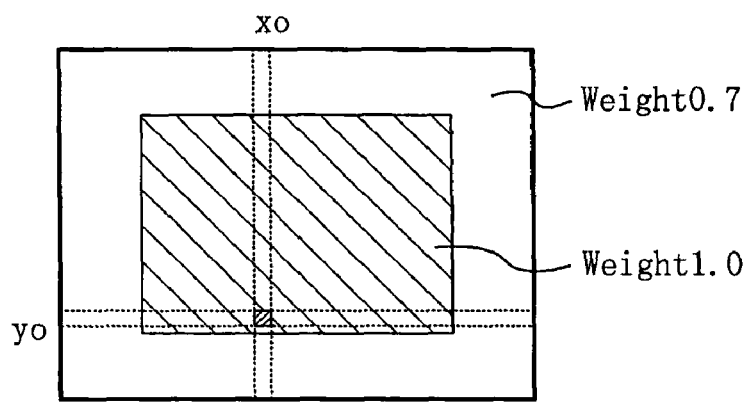
(c) Example of synthetic image
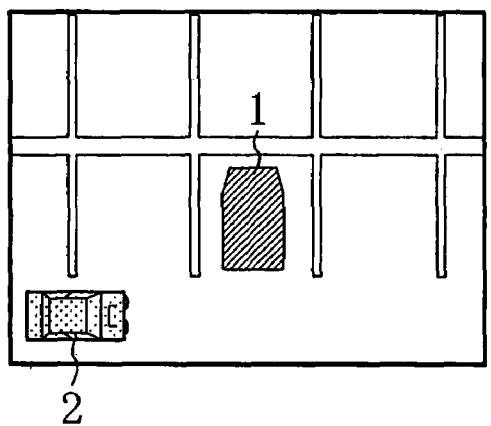

FIG. 12
(a) Composition E of synthetic image
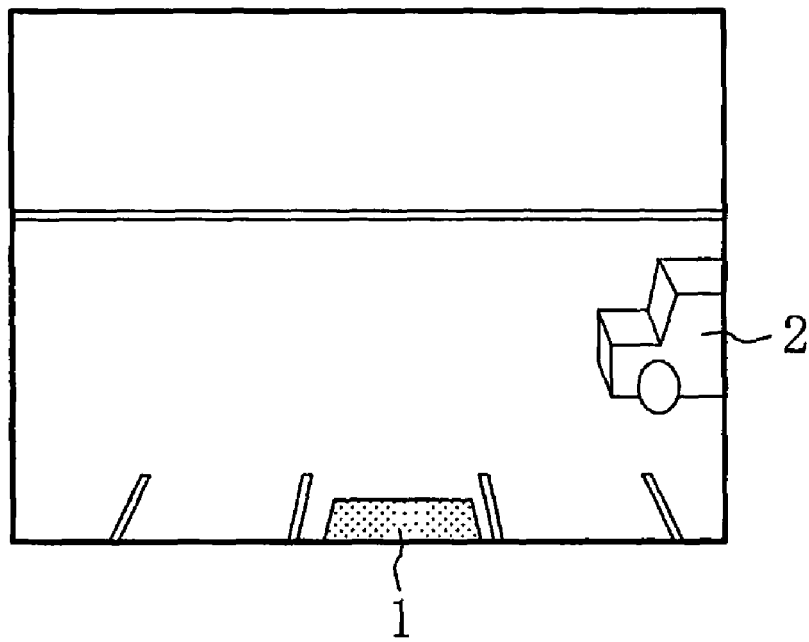
(b) Example of weight of image synthesis parameter
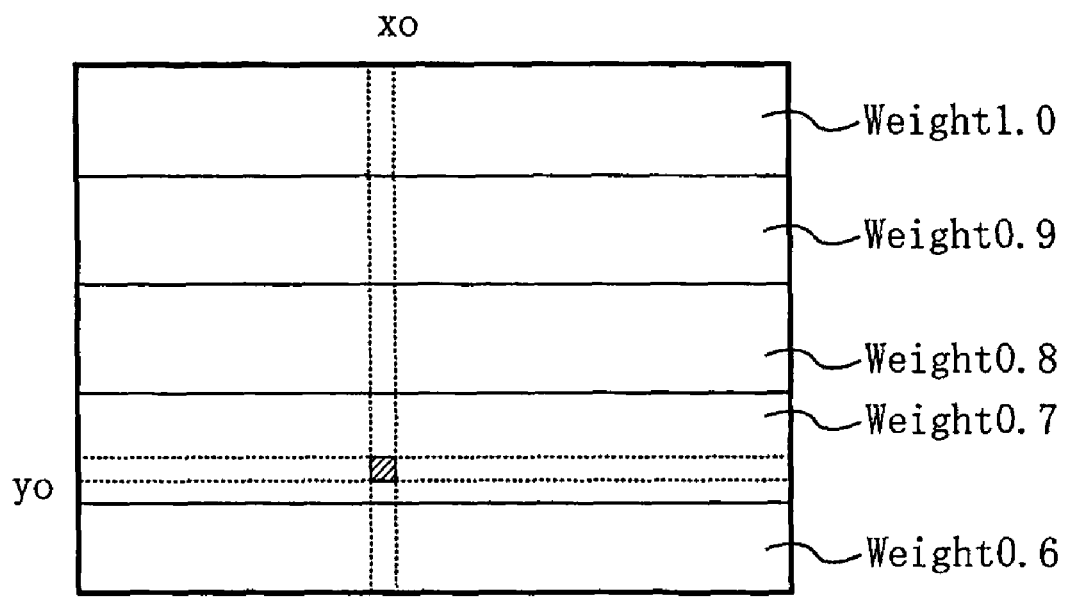

FIG. 13
(a) One-frame camera image
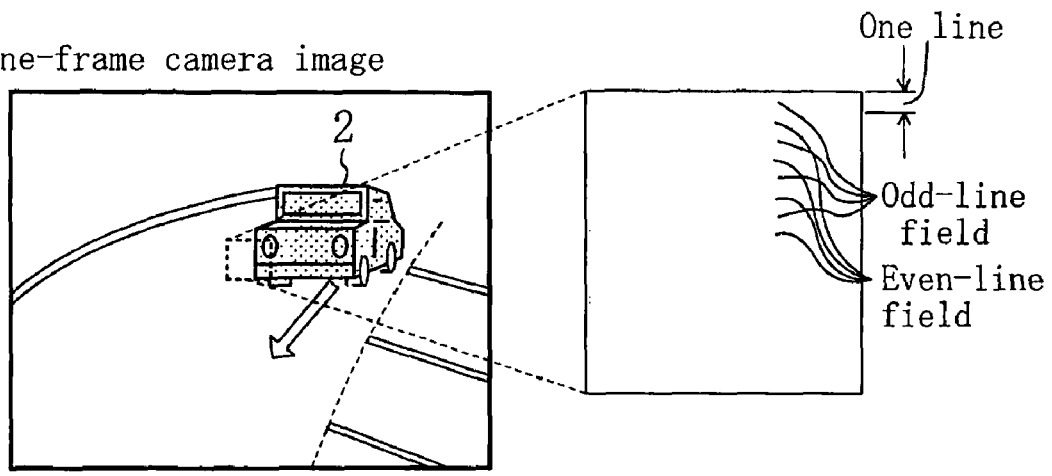
(b) Example of synthetic image using frame image
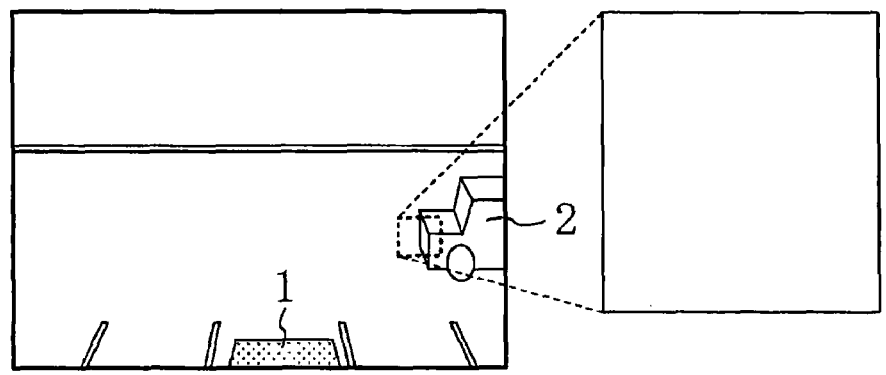
(c) Example of synthetic image using one-field (odd-line field) image
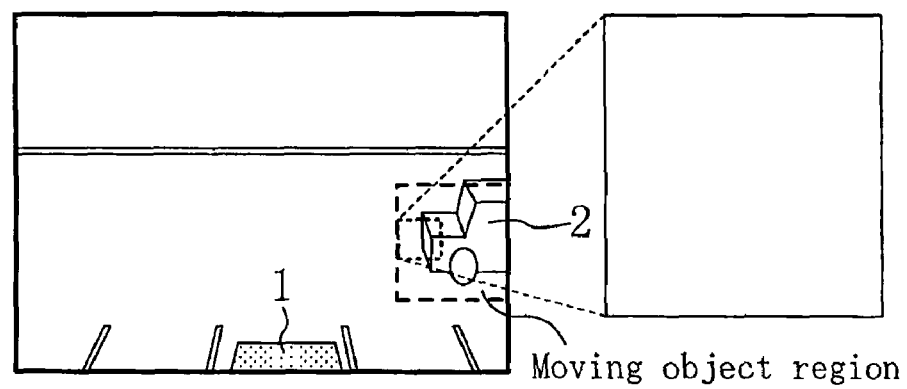

FIG. 14
(a)
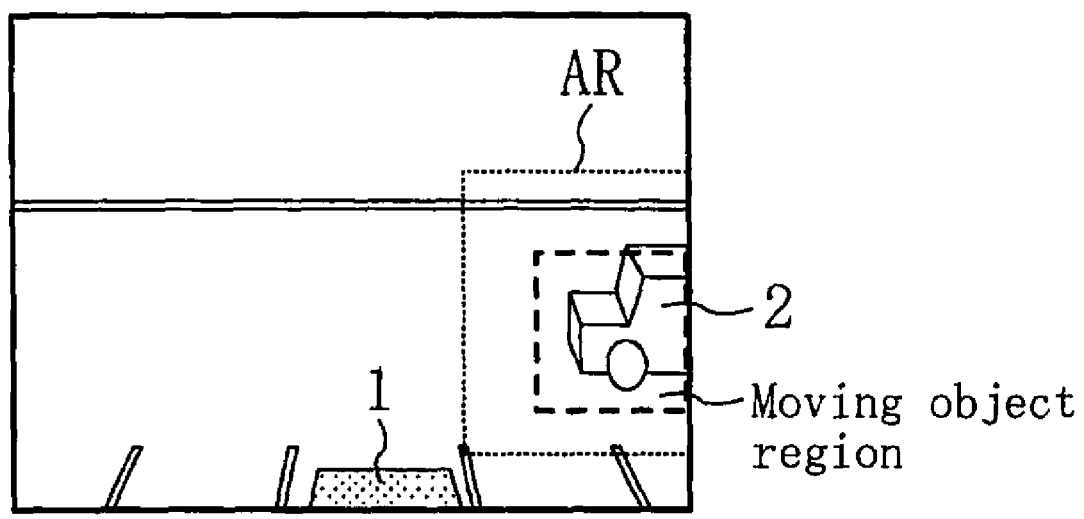
(b)
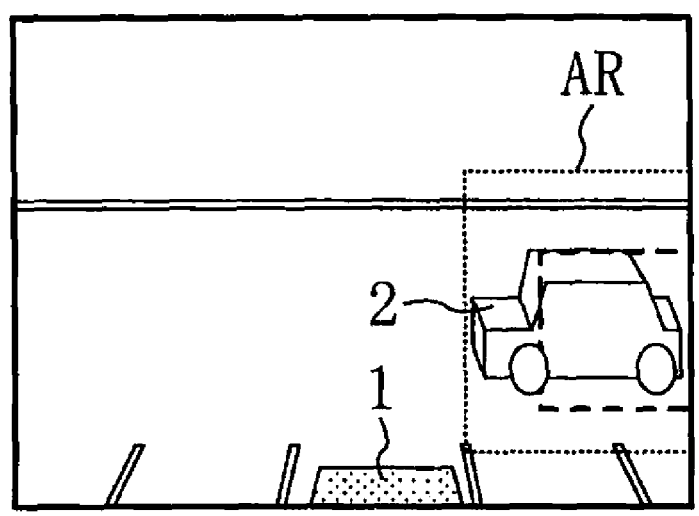

FIG. 16
(a) Constitution
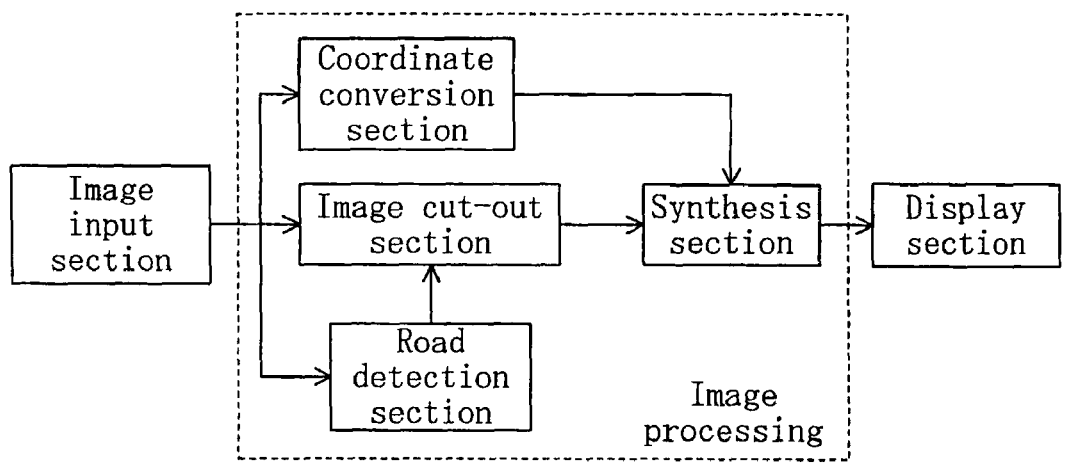
(b) Input image
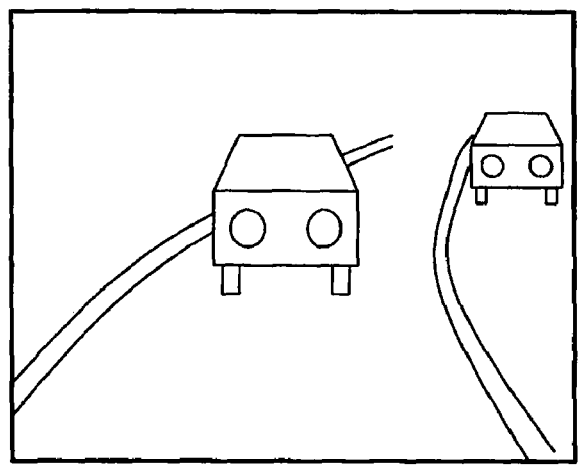
(c) Synthetic image
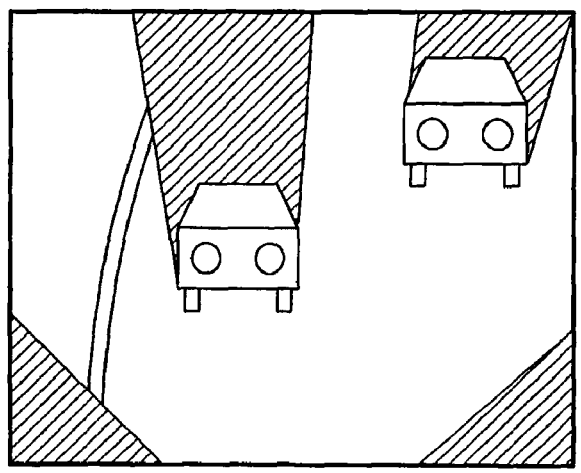

MONITORING SYSTEM AND VEHICLE SURROUNDING MONITORING SYSTEM

CROSS REFERENCE TO RELATED APPLICATIONS

This is a continuation of U.S. application Ser. No. 12/267,829 filed Nov. 10, 2008 which is a continuation of U.S. application Ser. No. 11/326,922 filed Jan. 6, 2006, said application having matured into U.S. Pat. No. 7,512,251 issued Mar. 31, 2009, which is a continuation of Application PCT/JP2005/009771 filed on May 27, 2005. This Non-provisional application claims priority under 35 U.S.C. §119(a) on Patent Application No. 2004-176812 filed in Japan on Jun. 15, 2004 and Patent Application No. 2005-005151 filed in Japan on Jan. 12, 2005, the entire contents of which are hereby incorporated by reference.

BACKGROUND OF THE INVENTION

The present invention relates to image recognition in detecting a moving object in an image, and particularly relates to a technology for realizing generation of a synthetic image according to a shooting state and detection of a moving object in an image in combination.

In conventional technologies in surrounding monitoring systems, there are techniques for detecting a moving object or an obstacle which involve hindrance for driving from images of vehicle surroundings shot by a camera installed to a vehicle and techniques for displaying a state of the vehicle surroundings as an image including the moving object or the obstacle.

Referring to an example of the techniques of moving object detection for monitoring vehicle surroundings, there is a technique in which a moving object approaching a vehicle is detected from images obtained by shooting vehicle surroundings with the use of optical flow (for example, Patent Documents 1 and 2). In Patent Document 1, for example, optical flow is calculated form images obtained by a camera installed so as to look rearward of a vehicle. Flow vectors having a magnitude equal to or larger than a predetermined threshold value and having the same direction as an approaching object are extracted. Then, the approaching object is discriminated on the basis of the flow vectors.

Referring to an example of the techniques of displaying a state of vehicle surroundings as an image, there is a technique of displaying a moving object detected from an input image shot by a camera, as a synthetic image. The synthetic image is generated and displayed as if it is shot from a position different from the camera position (for example, Patent Documents 3 to 5). In Patent Document 3, for example, with the use of a system shown in FIG. 16(a), a road region and a non-road region in which an obstacle is present are separated from an input image obtained by shooting vehicle surroundings as shown in FIG. 16(b). The road region is subjected to deformation processing to obtain an image viewed from above while the non-road region is subjected to expansion/contradiction processing to be in an appropriate size. Then, the obtained images are superimposed and displayed as a synthetic image as shown in FIG. 16(c).

Patent Document 1: Japanese Patent No. 3011566B
Patent Document 2: Japanese Patent Application Laid Open Publication No. 2004-56763A
Patent Document 3: Japanese Patent Application Laid Open Publication No. 07-186833A
Patent Document 4: Japanese Patent Application Laid Open Publication No. 06-333200A
Patent Document 5: Japanese Patent Application Laid Open Publication No. 11-78692A

SUMMARY OF THE INVENTION

However, the following problems are involved in the above mentioned conventional techniques for detecting a moving object or an obstacle and for displaying a state of vehicle surroundings.

Firstly, in the case where a moving object or the like is detected using a camera image as an input, a detected moving object region is calculated with reference to pixel coordinate values of an input image as reference. For this reason, in order to display the detected moving object region of a synthetic image different from the input image, conversion of the pixel coordinate values of the detected moving object into pixel coordinate values on the synthetic image is needed. This increases calculation loads for coordinate conversion and the like.

These calculation loads may involve a comparatively insignificant problem in a case of processing in which a calculation load for moving object detection is large, but offers a severe problem particularly in a case of processing in which a calculation load is small such as moving object detection utilizing intensity change, generation of a synthetic image using a table, and the like.

Secondly, in the conventional technique for detecting a moving object or the like, detection is performed for each input image. For this reason, in a case of detection of a moving object using images shot by multiple cameras, it is difficult to detect an object present in the vicinity of a boundary of shooting ranges of the cameras and to detect an object moving across the shooting ranges of the multiple cameras.

In view of the above problems, the present invention has its object of enabling, with a small calculation load, both generation of a synthetic image showing a state of a monitoring region and detection of a moving object in a monitoring system using camera images shot by a plurality of cameras as inputs and enabling easy detection of a moving object ranging across shooting ranges of a plurality of cameras.

The present invention provides a monitoring system to which camera images shot by a plurality of cameras are input, including: an image synthesis section for generating a synthetic image showing a state of a monitoring region by synthesizing camera images; and a moving object detection section for detecting, in the synthetic image, a moving object region estimated as a region where a moving object is present.

In the above invention, detection of the moving object region is performed for a synthetic image showing a state of a monitoring region which is synthesized from the camera images. Accordingly, the detection result is calculated with reference to pixel coordinate values of the synthetic image as reference, eliminating the need for coordinate conversion and the like even for displaying the detection result to minimize a calculation load. Further, a moving object is detected only after the camera images shot by the plurality of cameras are synthesized to one synthetic image. This leads to easy detection of a moving object ranging across shooting ranges of a plurality of camera or an object in the vicinity of a camera boundary.

Further, the monitoring system according to the present invention preferably includes: a parameter storage section for storing a plurality of image synthesis parameters that express correspondence between camera images and a synthetic image and a plurality of detection parameters that define specification of moving object detection; and a parameter selection section for selecting each one from the plurality of image synthesis parameters and the plurality of detection parameters which are stored in the parameter storage section, wherein the image synthesis section operates according to an image synthesis parameter selected by the parameter selection section, and the moving object detection section operates according to a detection parameter selected by the parameter selection section.

With the above constitution, synthetic images according to various states can be generated and moving object detection in various states can be performed to the thus generated synthetic images.

According to the present invention, a monitoring system can be realized which is capable of easily detecting a moving object across the shooting ranges of multiple cameras with a small calculation load.

BRIEF DESCRIPTION OF THE DRAWINGS

FIG. 2(a) shows camera positions and a shooting state in each embodiment of the present invention and FIG. 2(b) and FIG. 2(c) show examples of images shot by cameras indicated in FIG. 2(a).

FIG. 4 shows examples of synthetic images of which compositions are different from each other.

FIG. 5 shows one example of a parameter selection rule in Embodiment 1 of the present invention.

FIG. 6(a) shows one example of region blocks in moving object detection and FIG. 6(b) shows an example of a synthetic image for display in which a moving object region is shown.

FIG. 7 shows examples of synthetic images for display according to a first operation example in Embodiment 1 of the present invention.

FIG. 9 shows one example of a parameter selection rule in Embodiment 2 of the present invention.

FIG. 10 shows examples of synthetic images for display according to an operation example in Embodiment 2 of the present invention.

FIG. 11 includes drawings for explaining one example of an image synthesis parameter in Embodiment 3 of the present invention.

FIG. 12 includes drawings for explaining another example of an image synthesis parameter in Embodiment 3 of the present invention.

FIG. 13 includes drawings showing examples of synthetic images for display in Embodiment 4 of the present invention.

FIG. 14 includes drawings showing examples of synthetic images for display in Embodiment 4 of the present invention.

FIG. 16 includes drawings showing a constitution of a surrounding monitoring system and examples of an image according to a conventional technique.

DESCRIPTION OF THE PREFERRED EMBODIMENTS

Figure 1:
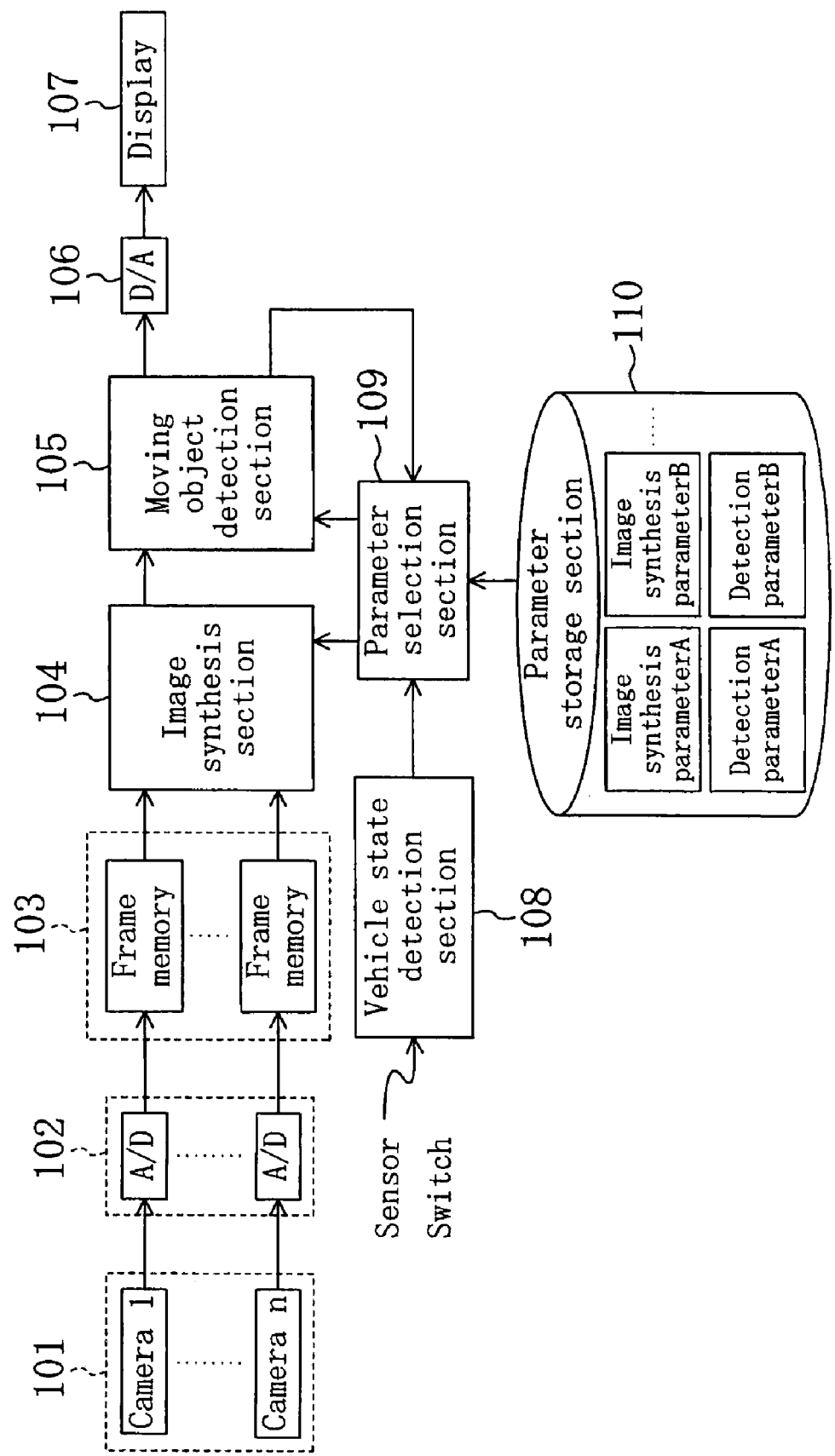
FIG. 1 is a block diagram showing a constitution of a vehicle surrounding monitoring system according to each embodiment of the present invention.

A first aspect of the present invention provides a monitoring system to which camera images shot by a plurality of cameras are input, including: an image synthesis section for generating a synthetic image showing a state of a monitoring region by synthesizing the camera images; and a moving object detection section for detecting, in the synthetic image, a moving object region estimated as a region where a moving object is present.

A second aspect of the present invention provides the monitoring system of the first aspect, further including: a parameter storage section for storing a plurality of image synthesis parameters each expressing correspondence between camera images and a synthetic image and a plurality of detection parameters each defining specification of moving object detection; and a parameter selection section for selecting each one from the plurality of image synthesis parameters and the plurality of detection parameters which are stored in the parameter storage section, wherein the image synthesis section operates according to an image synthesis parameter selected by the parameter selection section, and the moving object detection section operates according to a detection parameter selected by the parameter selection section.

A third aspect of the present invention provides the monitoring system of the second aspect, wherein the plurality of cameras are installed to a moving body, and the parameter selection section performs parameter selection according to a state of the moving body.

A fourth aspect of the present invention provides the monitoring system of the third aspect, wherein the parameter selection section performs parameter selection taking account of a detection result by the moving object detection section.

A fifth aspect of the present invention provides the monitoring system of the fourth aspect, wherein the parameter selection section performs parameter selection taking account of a currently selected image synthesis parameter.

A sixth aspect of the present invention provides the monitoring system of the fourth aspect, wherein when the moving object region is detected by the moving object detection section, the parameter selection section modifies the selected image synthesis parameter so that only one of fields of camera images are referenced for a part corresponding to the moving object region and outputs it.

A seventh aspect of the present invention provides the monitoring system of the sixth aspect, wherein the parameter selection section performs the modification for a part corresponding to a region surrounding the moving object region in addition to the moving object region.

An eighth aspect of the present invention provides the monitoring system of the third aspect, wherein the parameter selection section selects a detection parameter that defines stop of moving object detection when the moving body is moving.

A ninth aspect of the present invention provides the monitoring system of the second aspect, wherein the parameter selection section selects, upon selection change in image synthesis parameter, a detection parameter that defines stop of moving object detection for a predetermined period of time.

A tenth aspect of the present invention provides the monitoring system of the second aspect, wherein the parameter selection section halts, upon selection change in image synthesis parameter, change in image synthesis parameter for a predetermined period of time.

An eleventh aspect of the present invention provides the monitoring system of the first aspect, wherein the moving object detection section calculates a statistic of pixel values in each small region into which the synthetic image is divided and specifies a small region of which time variation in statistic exceeds a predetermined value as the moving object region.

A twelfth aspect of the present invention provides the monitoring system of the eleventh aspect, wherein the plurality of image synthesis parameters include weights attached to pixel values of camera images used for image synthesis, and the image synthesis section performs weighting to each pixel value using the weights included in the image synthesis parameter and generates the synthetic image.

A thirteenth aspect of the present invention provides the monitoring system of the twelfth aspect, wherein in at least one of the plurality of image synthesis parameters, the weights attached to the pixel values are set relatively large in a region of a synthetic image where necessity of moving object detection is relatively high.

A fourteenth aspect of the present invention provides the monitoring system of the twelfth aspect, wherein in at least one of the plurality of image synthesis parameters, the weights attached to the pixel values are set so that time variation in statistic of pixel values when an identical object moves becomes constant in a synthetic image.

A fifteenth aspect of the present invention provides the monitoring system of the fourteenth aspect, wherein in at least one of the plurality of image synthesis parameters, the weights attached to the pixel values are set relatively small in a region of a synthetic image where a subject of the same size is seen relatively large.

A sixteenth aspect of the present invention provides the monitoring system of the second aspect, wherein at least one of the plurality of image synthesis parameters stored in the parameter storage section is based on an assumption that a subject in camera images is present on a road plane and is used for generating a synthetic image where the road plane is shot from a virtual viewpoint.

A seventeenth aspect of the present invention provides a vehicle surrounding monitoring system for monitoring surroundings of a vehicle using camera images shot by a plurality of cameras installed to the vehicle, including: a parameter storage section for storing a plurality of image synthesis parameters each expressing correspondence between camera images to a synthetic image; a parameter selection section for selecting, according to a state of the vehicle, one from the plurality of image synthesis parameters stored in the parameter storage section; an image synthesis section for generating a synthetic image showing a surrounding state of the vehicle by synthesizing the camera images according to an image synthesis parameter selected by the parameter selection section; and a moving object detection section for detecting, in the synthetic image, a moving object region estimated as a region where a moving object is present.

Embodiments of the present invention will be described below with reference to the drawings.

Embodiment 1

FIG. 1 is a block diagram showing a constitution of a vehicle surrounding monitoring system as a monitoring system according to Embodiment 1 of the present invention. In FIG. 1, reference numeral 101 denotes cameras each for shooting a moving image and outputting an image signal, 102 denotes A/D converters each for digitalizing an image signal, and 103 denotes frame memories each for storing digitalized image data temporarily. The cameras 101 are installed to a vehicle so as to shoot surroundings of the vehicle as a moving body. The frame memories 103 are capable of successively storing image data output from the A/D converters 102 while reading out arbitrary pixel data of a preceding stored image in accordance with a read request from an image synthesis section 104.

Reference numeral 104 denotes the image synthesis section for synthesizing camera images read out from the frame memories 103 to generate a synthetic image showing a state of a monitoring region including vehicle surroundings, and 105 denotes a moving object detection section for detecting, in a synthetic image output from the image synthesis section 104, a moving object region estimated as a region where a moving object is present. The moving object detection section 105 superimposes, upon detection of a moving object region, graphics on a corresponding region of the synthetic image and outputs it as a synthetic image for display. Reference numeral 106 denotes a D/A converter for converting a synthetic image for display output from the moving object detection section 105 into an image signal, 107 denotes a display for displaying an image signal. The display 107 is installed at a place which a driver in the vehicle can observe.

Further, reference numeral 110 denotes a parameter storage section for storing a plurality of image synthesis parameters and a plurality of detection parameters, and 109 denotes a parameter selection section for selecting one from the plural image synthesis parameters stored in the parameter storage section 110 and selects one from the plural detection parameters. Herein, each image synthesis parameter is a parameter that expresses correspondence between camera images and a synthetic image and is used for image synthesis in the image synthesis section 104. On the other hand, each detection parameter is a parameter that defines specification of moving object detection, such as a threshold value in moving object detection and is used for moving object detection in the moving object detection section 105. Specifically, the image synthesis section 104 reads out camera images from the frame memories 103 according to an image synthesis parameter selected by the parameter selection section 109 to perform image synthesis and performs operation for moving object detection according to a detection parameter selected by the parameter selection section 109.

Reference numeral 108 denotes a vehicle state detection section for detecting a vehicle state, inputs, for example, any one of or a plurality of outputs from sensors such as a vehicle velocity sensor, a steering angle sensor, and the like which detect a vehicle velocity, a moving direction, or the like and states of switches operated by a user, such as an ignition key, a shift lever, a direction indicator, and the like, and outputs it/them as a vehicle state to the parameter selection section 109. The parameter detection section 109 performs parameter selection according to a vehicle state output from the vehicle state detection section 108. As will be described later, a detection result by the moving object detection section 105 and/or a currently selected image synthesis parameter may be added in parameter selection.

Operation of the vehicle surrounding monitoring system as constituted as above will be described with reference to FIG. 2 through to FIG. 8.

The cameras 101 shoot vehicle surroundings and output image signals, the A/D converters 102 digitalize the image signals and output them as images, and the frame memories 103 store the digitalized images temporarily. Storage and update of images in the frame memories 103 are successively performed in synchronization with the image signals output from the cameras 101.

FIG. 2(a) shows camera positions and an example of a shooting state. Four cameras 1 to 4 are installed to a vehicle body so as to shoot surroundings of an own vehicle 1. The cameras 1 to 4 in FIG. 2 corresponds to the plurality of cameras 101 in FIG. 1 and constitutional elements other than the cameras 101 in FIG. 1 are installed within the own vehicle 1. The camera 1 and the camera 2 are installed so as to shoot the rear side of the vehicle over wide ranges. FIG. 2(b) and FIG. 2(c) show examples of images shot by the camera 1 and the camera 2, respectively. As shown in FIG. 2(b), another vehicle 2 running on the rear side of the own vehicle 1 is shot by the camera 1. The images as shown in FIG. 2(b) and FIG. 2(c) are digitalized and stored in the frame memories 103.

Figure 3:
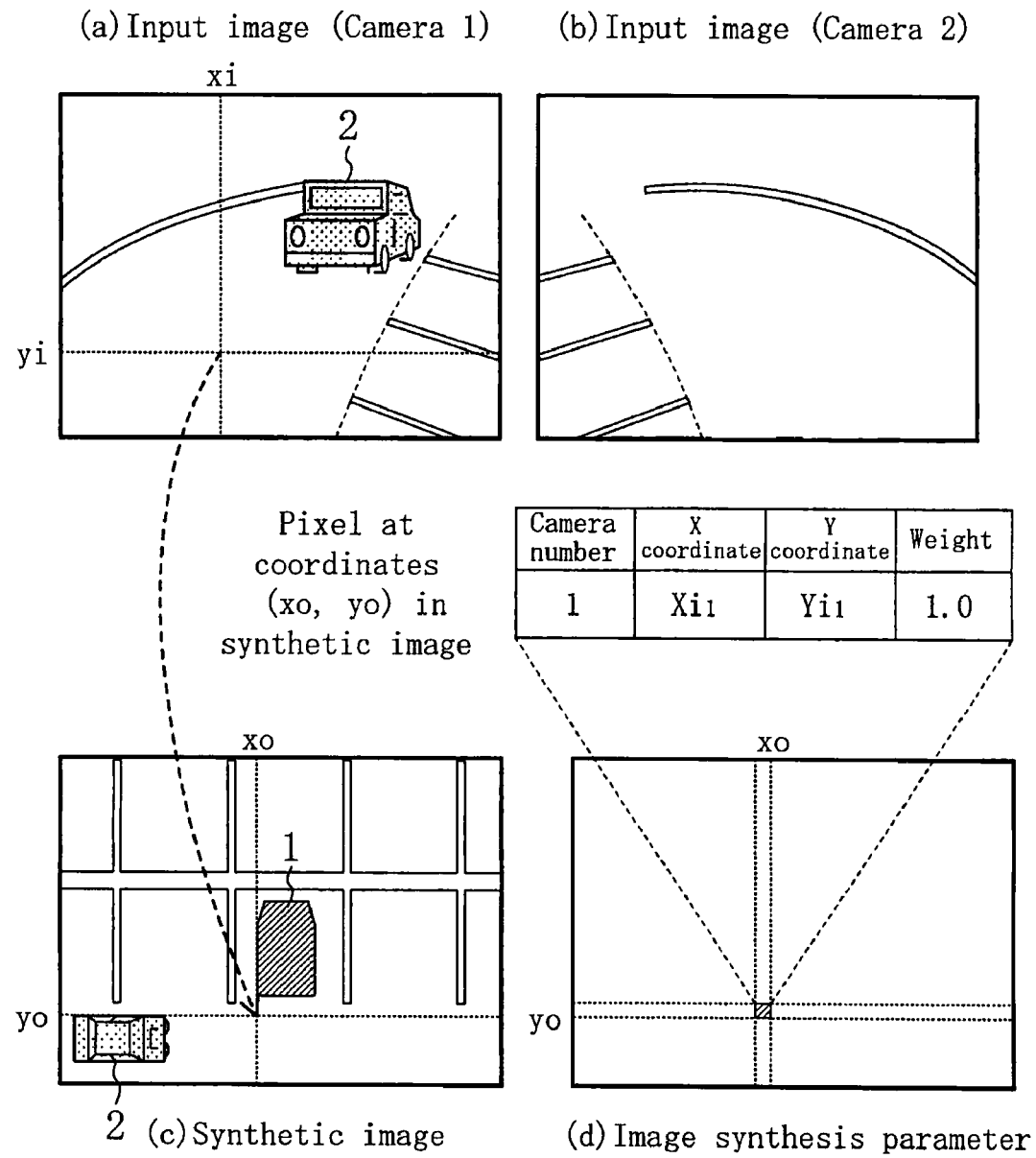
FIG. 3 shows examples of image synthesis parameters in Embodiment 1 of the present invention.

FIG. 3 shows examples of the image synthesis parameters stored in the parameter storage section 110. For generating a synthetic image of FIG. 3(c) from input images of FIG. 3(a) and FIG. 3(b) (the same as FIG. 2(b) and FIG. 2(c), respectively), the image synthesis parameter shown in FIG. 3(d) is used. The image synthesis parameter in FIG. 3(d) is expressed in a two-dimensional array in one to one correspondence to each pixel of a synthetic image. Each element in the two-dimensional array is composed of only a camera number of an input image, pixel coordinates (an X coordinate and a Y coordinate in this case), and a weight for a corresponding pixel value. In the example shown in FIG. 3, information of "camera number: 1, coordinates: (Xi1,Yi1), and weight: 1.0" is stored at coordinates (xo, yo) of an image synthesis parameter. This expresses provision of, to a pixel value at coordinates (xo, yo) in a synthetic image, a value obtained by multiplying the pixel value at the coordinates (Xi1,Yi1) in an image of the camera 1 by 1.0. With the use of such an image synthesis parameter, pixel correspondence between a plurality of camera images and a synthetic image can be described. Wherein, in the present invention, the weights in the image synthesis parameters are equal to each other, 1.0.

FIG. 4 shows examples of synthetic images generated from camera images in the shooting state shown in FIG. 2(a) according to image synthesis parameters. In FIG. 4, FIG. 4(a) is a synthetic image (composition A) in which whole surroundings of the own vehicle 1 are shown over a wide range, FIG. 4(b) is a synthetic image (composition B) showing the rear side of the own vehicle 1, FIG. 4(c) is a synthetic image (composition C) showing the front side of the own vehicle 1, and FIG. 4(d) is a synthetic image (composition D) showing the vicinity of the rear side of the own vehicle 1. As shown in FIG. 4, with the use of the image synthesis parameters different from each other, synthetic images of which compositions are different from each other can be generated from the same camera images.

Further, in FIG. 4, with the use of a plurality of images shot at different camera positions, each synthetic image is generated as if it was shot from another viewpoint different from the camera positions. The image synthesis parameters for generating such synthetic images can be obtained by a following manner, for example. Namely, on the assumption that a road face is one plane and all subjects in camera images shot by the plural cameras are present on the same plane, a correspondence between the camera images and a synthetic image is calculated with a positional relationship between the plural cameras and the road face known. This attains image synthesis parameters for generating synthetic images as shown in FIG. 4.

A constitution and a calculation method of the image synthesis parameters and an image synthesizing method are disclosed in detail in International Publication No. 00/64175 and the like, for example, and therefore, detailed description thereof is omitted herein.

FIG. 5 shows one example of a parameter selection rule in the parameter selection section 109. Herein, image synthesis parameters A, B, C, and D respectively corresponding to the compositions A, B, C and D (FIG. 4(a) to FIG. 4(d)) are stored as image synthesis parameters in the parameter storage section 110 in advance. Further, as the detection parameters, "operation" for executing moving object detection and "stop" for stopping the moving object detection are stored in the parameter storage section 110 in advance.

Further, herein, the vehicle state detection section 108 outputs a vehicle velocity and a shift lever state as a vehicle state. Accordingly, the parameter selection section 109 selects an image synthesis parameter and a detection parameter in accordance with the rule in FIG. 5 according to a vehicle velocity and a shift lever state. For example, when the vehicle velocity is "stop" and the shift lever is in "P" (parking) state or "N" (neutral) state, "A" and "operation" are selected as the image synthesis parameter and the detection parameter, respectively.

The image synthesis section 104 inputs an image synthesis parameter selected by the parameter selection section 109 and reads out sequentially the camera images corresponding to elements of the image synthesis parameter from the frame memories 103 to generate a synthetic image. This operation is executed every 1/30 second repeatedly so that generated synthetic images are outputted sequentially. The moving object detection section 105 inputs a detection parameter selected by the parameter selection section 109 and inputs a synthetic image output from the image synthesis section 104 every 1/30 second when the detection parameter is "operation" to perform detection of a moving object region to the synthetic image.

The moving object detection section 105 performs the moving object detection based on time variation in statistic of pixel values. Herein, an average of intensities is employed as the statistic of pixel values. Then, a region of which time variation in average of intensities is large is detected as a moving object region.

Specifically, the moving object detection section 105 divides a synthetic image into small regions, calculates and stores temporarily an average of intensities in each divided small region. Then, the average of intensities in each small region is compared with an average of intensities in a corresponding small region of a preceding (1/30 second preceding in this case) synthetic image. When a difference therebetween is larger than a predetermined threshold value, the corresponding small region is judged as a moving object region. Subsequently, graphics are superimposed on a position of the moving object region of the synthetic image and the thus superimposed image is output as a synthetic image for display. The moving object detection section 105 executes this operation every 1/30 second repeatedly.

FIG. 6(a) shows one example of region division in the moving object detection, wherein a synthetic image is divided into 48 blocks of small regions, namely, eight blocks in the horizontal direction (the transverse direction in the drawing) and six blocks in the perpendicular direction (the vertical direction in the drawing). FIG. 6(b) shows an example of a synthetic image for display, wherein graphics in the broken line for surrounding a region is superimposed on a small region (lower left in the drawing) detected as a moving object region.

The synthetic image for display output from the moving object detection section 105 is converted into an image signal by the D/A converter 106 and is displayed through the display 107.

First Operation Example

Suppose that the own vehicle 1 is in "stop" state and the shift lever is in "P" state in the state shown in FIG. 2(a). A this time, the parameter selection section 109 selects "A" as an image synthesis parameter and selects "operation" as a detection parameter. The image synthesis section 104 generates a synthetic image in the composition A (FIG. 4(a)) according to the image synthesis parameter A and the moving object detection section 105 performs the moving object detection according to the detection parameter.

In the case where the other vehicle 2 is moving herein, the intensity varies in a region where the other vehicle 2 is present in the synthetic image. Accordingly, the moving object detection section 105 detects a small region of which time variation in average of intensities exceeds a predetermined threshold value as a moving object region and outputs a synthetic image for display as shown in FIG. 7(a). Further, as the other vehicle 2 moves forward, synthetic images for display as shown in FIG. 7(b) and FIG. 7(c) are output.

Second Operation Example

Suppose that a driver operates the shift lever to change the state from "P" state to "R" (reverse) state in a state where the synthetic image for display as shown in FIG. 8(a) is displayed. Accordingly, the parameter selection section 109 changes selection of the image synthesis parameter from "A" to "B" in accordance with the rule in FIG. 5. Whereby, the composition of a synthetic image generated by the image synthesis section 104 is changed from the composition A to the composition B. Further, the moving object detection section 105 performs the moving object detection to the synthetic image in the composition B. At that time, synthetic images for display as shown in FIG. 8(b) and FIG. 8(c) are output as the other vehicle 2 moves forward.

In the above described vehicle surrounding monitoring system according to the present embodiment, the moving object detection is performed to a synthetic image, eliminating the need for processing such as coordinate conversion for the position of a detected small region and the like. Further, the detection is performed after a plurality of camera images are synthesized, eliminating the need for special processing in moving object detection in the vicinity of a boundary between shooting ranges of the cameras as in FIG. 8(b) to attain easy moving object detection.

Figure 8:
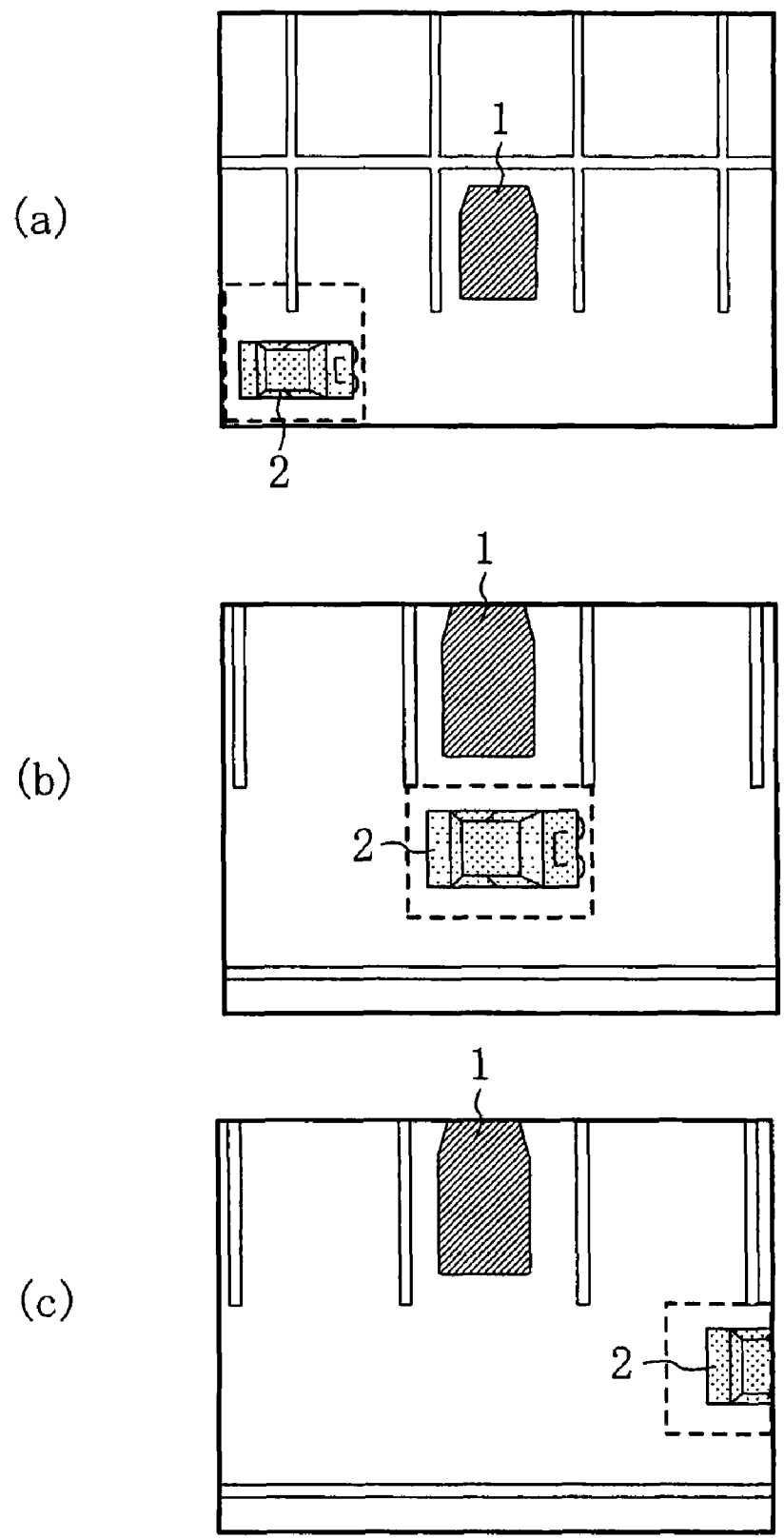
FIG. 8 shows examples of synthetic images for display according to a second operation example in Embodiment 1 of the present invention.

Moreover, in the synthetic images for display as shown in FIG. 7 or FIG. 8, the state of vehicle surroundings can be grasped easily. Further, the moving object region is enhanced by the graphics, so that a driver can easily grasp the presence of a moving object having high possibility of collection or the like, compared with a case of direct observation of original camera images.

As described above, in the present embodiment, a synthetic image is generated from a plurality of camera images and the moving object detection is performed using the thus synthetic image. This eliminates need for complicated processing such as coordinate conversion of a detection result, integration of detection results in the camera images, and the like to reduce calculation loads and to attain easy detection of a moving object ranging across a boundary of the shooting ranges of the cameras.

Especially, for the purpose of monitoring vehicle surroundings, an image is desirable in which a viewable range surrounding the vehicle is seen as wide as possible and the vicinity of the vehicle is also seen. For shooting such an image, it is required to install a plurality of cameras in different positions, as shown in FIG. 2, for example. When images shot by a plurality of cameras different in position from each other are used for generating one synthetic image in which the position of a subject is unknown, a synthetic image in which a subject is seen double or no subject is seen may be generated in general. While, for the purpose of monitoring vehicle surroundings, normally, a moving object or an obstacle to be monitored by a user is present on a road face and is rare to be present below the road plane or in the air. Accordingly, when a synthetic image is generated where the road plane is shot plane from a virtual viewpoint on the assumption that a subject in camera images are present on the road plane, at least a part of the subject which is in contact with the road face is not seen double and does not disappear even if a plurality of camera images different in shooting position are used. Thus, in detection of a moving object in vehicle surroundings using such a synthetic image, neither double detection nor disappearance of a subject occurs even if the subject ranges across a boundary between the shooting ranges of the cameras.

It is noted that the parameters are selected in accordance with the rule in FIG. 5 with reference to a vehicle velocity and a shift lever state as a vehicle state in the present embodiment but the rule for the parameter selection and the vehicle state used for the parameter selection are not limited to those indicated herein. For example, the vehicle state to be referenced for the parameter selection may be any information only if it relates to the image synthesis parameters and the detection parameters.

Embodiment 2

A vehicle surrounding monitoring system according to Embodiment 2 of the present invention is constituted as shown in FIG. 1 like Embodiment 1. Difference from Embodiment 1 lies in that while the parameter selection is performed according to the vehicle state in Embodiment 1, the parameter selection is performed according to a detection result by the moving object detection section 105 and a currently selected image synthesis parameter in addition to the vehicle state. Each constitutional element other than the parameter selection section 109 performs the same operation as that in Embodiment 1.

FIG. 9 shows one example of a parameter selection rule in the present embodiment. In FIG. 9(a), an evaluation region in the words, a "state of moving object detection in each evaluation region" means a region determined for reflecting a result of moving object detection on the parameter selection. FIG. 9(b) shows one example of setting of the evaluation regions, wherein the 48 blocks of small regions described in Embodiment 1 are grouped into four middle-seized regions (evaluation regions 1 to 4). Upon detection of a moving object region, the detection result is replaced by presence or absence of detection in each evaluation region shown in FIG. 9(b). For example, when any of 12 blocks of small regions corresponding to the "evaluation region 1" is judged as a moving object region, this is expressed as "an object is detected in the evaluation region 1."

In the setting of evaluation regions as shown in FIG. 9(b), the vehicle surroundings are divided into the front side and the rear side of the own vehicle and are divided into a vicinity section and a distant section thereof. This is based on that an appropriate composition depends on whether a moving object is present on the front side or the rear side, that it is preferable to change the composition to a composition that reflects a wide range when a moving object is present at a distance, and the like. Of course, the setting of evaluation regions is not limited to that shown in FIG. 9(b) and the number of evaluation regions is not limited to four. For example, each small region may be used directly as an evaluation region.

Operation Example

First, suppose that the other vehicle 2 is present in a place out of the shooting ranges of the cameras yet in the state shown in FIG. 2(a). In the initial state after the operation starts, the parameter selection section 109 selects "A" as an image synthesis parameter and "stop" as a detection parameter. At that time, the image synthesis section 104 outputs a synthetic image in the composition A (FIG. 4(a)) and the moving object detection section 105 does not execute the moving object detection.

Next, since the own vehicle 1 is in "stop" state and the shift lever is in "P" state while the moving object detection is not performed yet, the parameter selection section 109 remains selecting "A" as an image synthesis parameter and selects "operation" as a detection parameter in accordance with the selection rule in FIG. 9(a). Herein, it is supposed that the other vehicle 2 is moving and approaching. The moving object detection section 105 detects a small region corresponding to the other vehicle 2 as a moving object region to output a synthetic image for display as shown in FIG. 10(a). In association therewith, information on an evaluation region (the evaluation regions 1 and 2 herein) to which the detected moving object region belong is output as a detection result into the parameter selection section 109.

Subsequently, the parameter selection section 109 selects and outputs, upon receipt of the detection result from the moving object detection section 105, "B" is newly selected as an image synthesis parameter according to information that the moving object is detected in the evaluation region 1 and information that the own vehicle is in "stop" state and the shift lever is in "P" state. The detection parameter remains as "operation." The image synthesis section 104 outputs a synthetic image in the composition B (FIG. 4(b)) according to the image synthesis parameter B, and the moving object detection section 105 performs moving object detection to the synthetic image in the composition B. Then, a small region corresponding to the other vehicle 2 is detected as a moving object region and the synthetic image for display as shown in FIG. 10(b) is output. In association therewith, the evaluation region 1 is output as a detection result into the parameter selection section 109.

Herein, suppose that a driver operates the shift lever to change the state from "P" state to "R" (reverse) state. At that time, the parameter selection section 109 newly selects and outputs "D" as an image synthesis parameter according to information that the moving object is detected in the evaluation region 1 and information that the own vehicle is in "stop" state and the shift lever is in "R" state. The detection parameter remains as "operation." The image synthesis section 104 outputs a synthetic image in the composition D (FIG. 4(d)) according to the image synthesis parameter D, and the moving object detection section 105 performs the moving object detection to the synthetic image in the composition D. As a result, a synthetic image for display as shown in FIG. 10(c) is output.

This processing for selecting a next image synthesis parameter taking account of a detection result of the moving object detection and the current image synthesis parameter means selection of a next image synthesis parameter taking account of the position of a moving object region on a synthetic image in the surroundings of the own vehicle 1. In other words, a next image synthesis parameter can be selected according to the position of a moving object detected in the surroundings of the own vehicle 1, enabling presentation of a synthetic image for display appropriate to both a vehicle state and a state of a moving object in the surroundings.

For example, when the other vehicle 2 as a moving object is present on the rear side of the own vehicle 1, it can be said that a synthetic image for display in the composition B as in FIG. 10(b) is appropriate for recognition of the other vehicle 2, compared with a synthetic image for display in the composition A as in FIG. 10(a). Also, under the conditions that there is possibility that the shift lever will be changed to "R" state, namely, possibility that a driver will move the own vehicle 1 backward and a moving object is present on the rear side of the own vehicle 1, a synthetic image for display in the composition D as in FIG. 10(c) is appropriate for recognition of the other vehicle 2 present on the rear side of the own vehicle 1, compared with a synthetic image for display in the composition B as in FIG. 10(b). Accordingly, more effective synthetic images for safe driving can be provided in the present embodiment, compared with Embodiment 1.

Further, in the present embodiment, the parameters are selected according to combination of a vehicle state, a result of the moving object detection, and the current image synthesis parameter, enabling further appropriate synthetic image display and moving object detection according to the state of vehicle surroundings. While, in the moving object detection in the moving object detection section 105 and display of a detection result involve no additional calculation load required for coordinate conversion, parameter change, or the like.

As described above, in the present embodiment, because a result of the moving object detection and the current image synthesis parameter are added as reference for parameter selection, an effect that a synthetic image for display further appropriate to the vehicle state and the state of a moving object in the vehicle surroundings can be presented, in addition to attainment of the same effects as in Embodiment 1.

It is noted that the parameter selection is executed in accordance with the rule as in FIG. 9(a) in the present embodiment but the rule for parameter selection is not limited to that indicated herein and any selection rule may be employed.

Embodiment 3

A vehicle surrounding monitoring system according to Embodiment 3 of the present invention is constituted as shown in FIG. 1 like Embodiment 1. Difference from Embodiment 1 lies in that while the weight of each element in the image synthesis parameters is equal to each other in Embodiment 1, accuracy of moving object detection to a synthetic image is controlled by setting values of weights in at least one of the plural image synthesis parameters in Embodiment 3. The operations of the other constitutional elements are the same as those in Embodiment 1 or 2.

An Example of the image synthesis parameter in the present embodiment will be described with reference to FIG. 11. The synthetic image of FIG. 11(a) is in the same composition as the composition A in FIG. 4(a). In detail, the image synthesis parameter used in the image synthesis herein is the same as the image synthesis parameter A in the camera number and the coordinate values of the camera images. Wherein, as shown in FIG. 11(b), values of the weights are not equal, namely, values different according to regions of the synthetic image are set as weights, which is the difference from the image synthesis parameter A. In the example shown in FIG. 11(b), 1.0 is set for each weight in the central part of the synthetic image while 0.7 is set for each weight in the surrounding part thereof.

When the parameter selection section 109 selects the image synthesis parameter shown in FIG. 11(b), the image synthesis section 104 generates a synthetic image as shown in FIG. 11(c). In FIG. 11(c), the composition is the same as in FIG. 11(a), wherein the intensity at the central part, in which the weight is 1.0, remains unchanged while the intensity of the surrounding part, in which the weight is 0.7, is dark relatively.

When the moving object detection section 105 performs the moving object detection to the synthetic image as shown in FIG. 11(c) with reference to the time variation in intensity as evaluation reference, the surrounding part of which intensity is low has relatively small time variation in intensity, resulting in poor sensibility for moving object detection compared with the central part. In other words, change in values of the weights in an image synthesis parameter can change the detection sensitivity for moving object detection in each region of a synthetic image. For example, wide range indication as in FIG. 11(a) is appropriate for a synthetic image. While in the case where the moving object detection suffices only in the surroundings of the own vehicle 1 at the central part, the image synthesis parameter as in FIG. 11(b) is selected and no change for the moving object detection itself is needed. Namely, in the image synthesis parameter in FIG. 11(b), the weights attached to the pixels value are set so as to be relatively large in a region for which the necessity of performing the moving object detection is relatively high.

Further, another example of the image synthesis parameter in the present embodiment will be described with reference to FIG. 12. The synthetic image of FIG. 12(a) is in a composition E in which the rear side of a vehicle is looked down obliquely in the state shown in FIG. 2(a). In the composition where a road is looked down obliquely, a seen subject may differ in size according to a position thereof on a synthetic image even if the subject is identical. In the synthetic image of FIG. 12(a), a seen subject (for example, the other vehicle 2) may differ in size according to a position relative to the own vehicle 1 even if the subject is identical. The other vehicle 2 is seen larger as it is nearer the own vehicle 1 while being seen smaller as it is farther from the own vehicle 1.

In the case where the moving object detection is performed to the above synthetic image with reference to the time variation in intensity as evaluation reference, detection sensibility differs according to the position where a moving object is seen in the synthetic image even if the moving object is identical. In detail, the detection sensibility increases as the moving object is at a position where it is seen large while decreasing as the moving object is at a position where it is seen small. Thus, the detection sensibility in the moving object detection is not uniform.

Under the circumstances, if it is desired to eliminate the difference in detection sensibility which is caused due to difference in position on a synthetic image and to attain further uniform detection sensibility, values of the weights in an image synthesis parameter is changed according to the difference in size of a subject seen in a synthetic image. In detail, the weights attached to the pixel values are set relatively small in a region of a synthetic image where a subject of the same size is seen relatively large.

FIG. 12(b) shows an example of the weight setting as above. In FIG. 12(b), the weights are set larger in a region where a subject is seen smaller in FIG. 12(a), that is, an upper region while being set smaller in a region where the subject is seen larger, that is, a lower region. The weight setting in this way minimizes the difference in detection sensibility for the moving object detection which is due to difference in position in a synthetic image, thereby attaining further uniform detection sensibility.

Referring to another method for attaining uniform detection sensibility, the weight attached to each pixel value of an image synthesis parameter may be set so that the time variation in statistic of pixel values when an identical subject moves becomes constant in synthetic images regardless of the position of the subject seen therein.

Specifically, first, in a synthetic image obtained by image synthesis according to an image synthesis parameter in which all weights are "1," time variation in statistic (for example, time variation in average of pixel values) in the case where an identical subject moves is calculated in each small region. Then, a value in proportion to the reciprocal of the calculated value is set newly as a value of the weight for the corresponding small region. This weight setting minimizes various differences such as difference in appearance of the subject, difference in intensity among input images, difference in intensity in an input image which is caused due to limb darkening, and the like in addition to the difference in size of the subject in a synthetic image, thereby attaining further uniform detection sensibility.

As described above, according to the present invention, the weight setting in an image synthesis parameter leads to accuracy control in the moving object detection. This enables adjustment of detection sensibility for moving object detection in each region of a synthetic image without increasing processing loads in the image synthesis section, the moving object detection section, and the like.

Embodiment 4

In Embodiment 4 of the present invention, when a moving object region is detected, an image synthesis parameter in a part corresponding to the moving object region is modified so as to reference only one of fields of camera images. This further improves image quality of an image in the moving object region.

A vehicle surrounding monitoring system according to the present embodiment is constituted as in FIG. 1 like Embodiment 1. Wherein, the cameras 101 perform interlace shooting and the frame memories 103 store interlace images. Further, the parameter selection section 109 inputs a vehicle state output from the vehicle state detection section 108 and a detection result output from the moving object detection section 105 and selects an image synthesis parameter and a detection parameter in accordance with a predetermined selection rule. The operations of the other constitutional elements are the same as those in the aforementioned embodiments.

In the present embodiment, the parameter selection section 109 outputs a selected image synthesis parameter of which coordinate values of camera images is partially modified when a moving object region is detected by the moving object detection section 105. Specifically, the parameter selection section 109 reads out camera image coordinate values of each element which corresponds to the position of the detected moving object region from the selected image synthesis parameter and outputs them after modifying them so that all Y coordinate values (coordinate values in the perpendicular direction) thereof become the nearest odd numbers. The image synthesis section 104 generates a synthetic image according to the thus modified image synthesis parameter.

As a result, in the image synthesis, only the camera images in odd-line fields are used in the moving object region while the camera images in both fields are used in a region where no moving object is detected. Hence, in the moving object region, a synthetic image is generated using only the odd-line fields of the camera images, inviting no lowering in image quality which is due to combing. On the other hand, the image synthesis is performed using both fields of the camera images in the region where no moving object is detected, increasing resolution compared with a case using only one of fields.

Effects obtainable in the present embodiment will be described with reference to FIG. 13. FIG. 13(a) shows an example of an input image of one frame shot by a camera 1 that performs interlace shooting in the state shown in FIG. 2(a). The drawing on the right hand in FIG. 13(a) is an enlarged view of the edge of the other vehicle 2 that is moving. In the interlace shooting, shooting is performed at different timings from each other in fields. Accordingly, the moving object in an image accompanies combing as shown in the drawing on the right hand in FIG. 13(a) when it is observed as a one-frame (two-field) image.

FIG. 13(b) shows an example of a synthetic image in the aforementioned composition E which is generated directly using the frame image of FIG. 13(a). The drawing on the right hand in FIG. 13(b) is an enlarged view of the edge of the other vehicle 2, wherein the combing in the frame image is deformed. This image invites lowering in image quality including flickering, roughness, and the like especially when it is observed as a moving image.

In contrast, in the present embodiment, the image synthesis parameter in a part corresponding to the moving object region is modified so that only one filed is used. FIG. 13(c) shows an example of a synthetic image generated according to the thus modified image synthesis parameter, and shows that an excellent image can be obtained without causing lowering in image quality which is due to combing shown in FIG. 13(b).

As described above, in the present embodiment, the selected image synthesis parameter is modified, upon detection of a moving object region, so that only one of the fields of the camera images is used in a part corresponding to the moving object region. This suppresses lowering in image quality which is due to combing in a synthetic image.

It is noted that in the present embodiment, the image synthesis parameter is modified so that all Y coordinate values of the camera images become odd numbers but it may be modified so that Y coordinate values thereof become even numbers, of course. In this case, image synthesis using the even-line fields of the camera images is performed in the moving object region.

Further, in the present embodiment, after a moving object region is detected, an image synthesis parameter is modified for a part corresponding to the moving object region and a synthetic image is generated according to the thus modified image synthesis parameter. For this reason, if a velocity of the moving object would be high, for example, a synthetic image with lowered image quality as in FIG. 13(b) may be output before the image synthesis parameter is modified upon detection of the moving object region.

This problem can be solved by modifying the image synthesis parameter for not only the moving object region but also the surrounding region thereof. FIG. 14(a) shows an example of such processing. In FIG. 14(a), the image synthesis parameter is modified so that the image synthesis is performed for a region AR including the moving object region and the surrounding region thereof using only one of the fields of the camera images. This enables indication of a synthetic image with no image quality lowered even if the other vehicle 2 would further move in the synthetic image to be in the state shown in FIG. 14(b). The moving object region and a range of approximately one block of each small region surrounding the moving object region may be set as the region AR, for example.

It is noted that in each embodiment of the present invention, four cameras are installed and the camera positions and the shooting ranges are set as shown in FIG. 2, but the number of cameras, the camera positions, and the shooting ranges are not limited thereto.

It is noted also that in each embodiment of the present invention, the plurality of cameras and the surrounding monitoring system are installed to a vehicle, especially, to a four-wheel automobile but the type of the vehicles is not limited. Further, the present invention is applicable to moving bodies other than vehicles, such as robots.

Further, the present invention can be applied for purposes other than monitoring of surroundings of a moving body. Image synthesis and moving object detection may be performed using cameras fixed in a shop, for example. Moreover, the image synthesis parameter is selected according to the vehicle state in each embodiment of the present invention but may be fixed or may be changed automatically as time progresses, for example.

In each embodiment of the present invention, time variation in average of intensities is used for the moving object detection but the evaluation index for the moving object detection is not limited to the average of intensities and may be any value only if it expresses a statistic of pixel values. For example, dispersion of a specified color component out of RGB may be used. Further, the number of blocks of the small regions is not limited to 48 blocks.

In each embodiment of the present invention, the moving object detection may not be performed for a predetermined period of time after selection of the image synthesis parameter is changed. For example, the parameter selection section 109 selects, upon selection change in image synthesis parameter, a detection parameter that defines stop of moving object detection for a predetermined period of time. This inhibits moving object detection immediately after the change in composition of a synthetic image or the like, obviating erroneous operation in moving object detection which is due to change in synthetic image.

In each embodiment of the present invention, the image synthesis parameter may not be changed for a predetermined period of time after selection of the image synthesis parameter is changed. For example, the parameter selection section 109 halts, upon selection change in image synthesis parameter, change in image synthesis parameter for a predetermined period of time. This inhibits frequent exchange of the image synthesis parameters, obviating lowering in viewability of a displayed image which is causes at frequent exchange.

In each embodiment of the present invention, the detection parameters include only two kinds of information, "operation" and "stop" but the present invention is not limited thereto. In general, various parameters are required for the moving object detection, and therefore, a plurality of detection parameters including them may be stored correspondingly to the compositions of the synthetic images. Further, a threshold value set for each small region may be stored as a detection parameter, for example.

Figure 15:
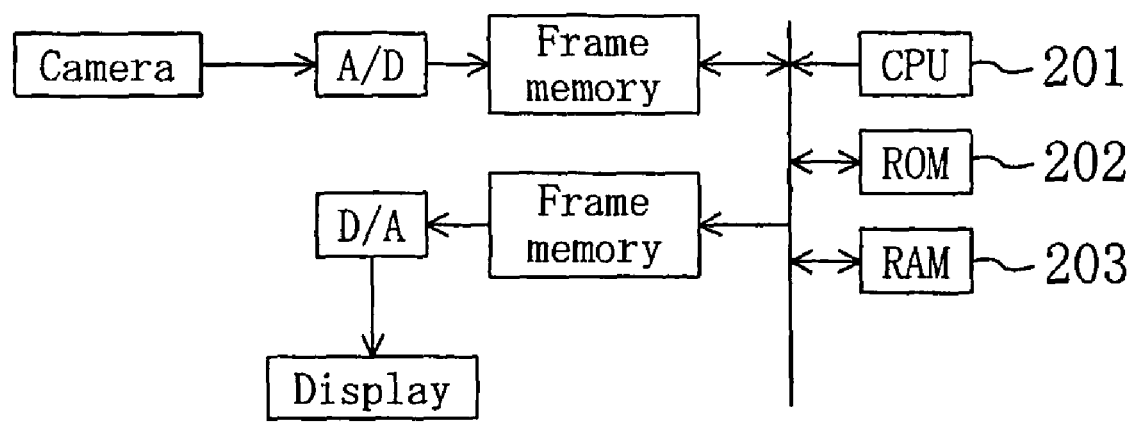
FIG. 15 is a constitutional diagram in the case where a monitoring system of the present invention is constituted using a computer.

In each embodiment of the present invention, each constitutional element may be realized by individual hardware or may be combined in a single IC or the like. In addition, each constitutional element may be realized through software to be executed by a computer (CPU 201, ROM 202, RAM 203, and the like) having an image input/output function, as shown in FIG. 15.

In the present invention, both generation of a synthetic image according to a shooting state and moving object detection in an image can be performed, and therefore, the present invention is useful for, for example, on-board surrounding monitoring systems, monitoring systems for security, and the like. Especially, the present invention is useful for monitoring systems that provide a region where a moving object is present in the form of an image generated from images shot by a plurality of cameras. Further, the present invention can be applied for the purpose of detecting a moving object from images shot by a plurality of cameras.

What is claimed is:

1. A monitoring system to which camera images shot by a plurality of cameras installed to a moving body are input, comprising:
   a parameter storage section for storing a plurality of image synthesis parameters each expressing correspondence between camera images and a synthetic image and a plurality of detection parameters each defining specification of moving object detection;
   a parameter selection section for selecting each one from the plurality of image synthesis parameters and the plurality of detection parameters which are stored in the parameter storage section;
   an image synthesis section for generating a synthetic image showing a state of a monitoring region by synthesizing the camera images according to the image synthesis parameter selected by the parameter selection section and for producing a synthetic image output based on the camera images shot by the plurality of cameras; and
   a moving object detection section that receives said synthetic image output by the image synthesis section and detects a moving object proximate to the moving body based on the synthetic image and the detection parameter selected by the parameter selection section wherein the moving object is detected in the synthetic image,
   wherein the parameter selection section performs parameter selection according to a state of the moving body and taking account of a detection result by the moving object detection section, and
   the parameter selection section performs parameter selection taking account of a currently selected image synthesis parameter.

2. A monitoring system to which camera images shot by a plurality of cameras installed to a moving body are input, comprising:
   a parameter storage section for storing a plurality of image synthesis parameters each expressing correspondence between camera images and a synthetic image and a plurality of detection parameters each defining specification of moving object detection;
   a parameter selection section for selecting each one from the plurality of image synthesis parameters and the plurality of detection parameters which are stored in the parameter storage section;
   an image synthesis section for generating a synthetic image showing a state of a monitoring region by synthesizing the camera images according to the image synthesis parameter selected by the parameter selection section and for producing a synthetic image output based on the camera images shot by the plurality of cameras; and
   a moving object detection section that receives said synthetic image output by the image synthesis section and detects a moving object proximate to the moving body based on the synthetic image and the detection parameter selected by the parameter selection section, wherein the moving object is detected in the synthetic image,
   wherein the parameter selection section performs parameter selection according to a state of the moving body and taking account of a detection result by the moving object detection section, and
   when the moving object region is detected by the moving object detection section, the parameter selection section modifies the selected image synthesis parameter so that only one of fields of camera images are referenced for a part corresponding to the moving object region and outputs it.

* * * * *